US012238188B2

(12) United States Patent
Tongya

(10) Patent No.: US 12,238,188 B2
(45) Date of Patent: *Feb. 25, 2025

(54) OFFENSIVE CHAT FILTERING USING MACHINE LEARNING MODELS

(71) Applicant: Microsoft Technology Licensing, LLC, Redmond, WA (US)

(72) Inventor: Monica Tongya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,868

(22) Filed: Oct. 13, 2023

(65) Prior Publication Data

US 2024/0048637 A1   Feb. 8, 2024

Related U.S. Application Data

(63) Continuation of application No. 17/190,530, filed on Mar. 3, 2021, now Pat. No. 11,805,185.

(51) Int. Cl.
| | |
|---|---|
| *H04L 67/50* | (2022.01) |
| *A63F 13/75* | (2014.01) |
| *A63F 13/87* | (2014.01) |
| *G06N 3/04* | (2023.01) |
| *G06N 3/08* | (2023.01) |
| *H04L 51/212* | (2022.01) |

(52) U.S. Cl.
CPC ............ *H04L 67/535* (2022.05); *A63F 13/75* (2014.09); *A63F 13/87* (2014.09); *G06N 3/04* (2013.01); *G06N 3/08* (2013.01); *H04L 51/212* (2022.05)

(58) Field of Classification Search
None
See application file for complete search history.

(56) References Cited

U.S. PATENT DOCUMENTS

| 11,170,309 B1* | 11/2021 | Stefani | ................ H04L 63/0428 |
| 2014/0089816 A1* | 3/2014 | DiPersia | ................ G06Q 50/01 |
| | | | 715/753 |
| 2019/0052471 A1* | 2/2019 | Panattoni | ............... H04L 67/306 |
| 2020/0117858 A1* | 4/2020 | Freeman | ................ G06F 40/117 |
| 2020/0196011 A1* | 6/2020 | Wyatte | .................... G06F 18/24 |
| 2020/0401766 A1* | 12/2020 | Brinig | ..................... G06F 40/30 |
| 2021/0004440 A1* | 1/2021 | Purnell | .................... G06N 7/01 |

(Continued)

*Primary Examiner* — Chris Parry
*Assistant Examiner* — Abderrahmen Chouat
(74) *Attorney, Agent, or Firm* — Alleman Hall & Tuttle LLP

(57) ABSTRACT

A server system is provided that includes one or more processors configured to execute a platform for an online multi-user chat service that communicates with a plurality of client devices of users of the online multi-user chat service that exchanges user chat data between the plurality of client devices. The one or more processors are configured to execute a user chat filtering program that performs filter actions for user chat data exchanged on the platform for the online multi-user chat service. The user chat filtering program includes a plurality of trained machine learning models and a filter decision service that determines a filter action to be performed for target portions of user chat data based on output of the plurality of trained machine learning models for those target portions of user chat data.

18 Claims, 8 Drawing Sheets

(56) References Cited

U.S. PATENT DOCUMENTS

2021/0064824 A1\* 3/2021 Ranatunga ............ H04L 51/212
2022/0094648 A1\* 3/2022 Le .......................... G06N 3/044
2022/0115033 A1\* 4/2022 Huffman ............... G10L 15/063

\* cited by examiner

TRAINING A TRANSFORMER MACHINE LEARNING MODEL

OFFENSIVE CHAT FILTERING USING MACHINE LEARNING MODELS

CROSS REFERENCE TO RELATED APPLICATIONS

This application is a continuation of U.S. patent application Ser. No. 17/190,530, filed Mar. 3, 2021, the entirety of which is hereby incorporated herein by reference for all purposes.

BACKGROUND

The computer gaming industry has been increasingly moving toward online services that often include a chat platform for users. The diverse customer base of these online games typically encompasses users with different tolerances to toxic behaviors and language. Conventional approaches typically flag known bad or abusive words. However, these approaches may not adequately address the gamut of offensive language and behaviors that may occur in an online game.

SUMMARY

To address these issues, a server system is provided. The server system may comprise one or more processors configured to execute a platform for an online multi-user chat service that communicates with a plurality of client devices of users of the online multi-user chat service. The platform may be configured to exchange user chat data between the plurality of client devices. The one or more processors may be configured to execute a user chat filtering program that performs filter actions for user chat data exchanged on the platform for the online multi-user chat service. The user chat filtering program may include a plurality of trained machine learning models and a filter decision service that determines a filter action to be performed for target portions of user chat data based on output of the plurality of trained machine learning models for those target portions of user chat data. The user chat filtering program may be configured to receive user chat data that includes a first user chat data and a second user chat data, process the first user chat data and the second user chat data using the plurality of trained machine learning models, determine that the first user chat data that includes a target word or phrase is offensive language based on output of the plurality of trained machine learning models for the first user chat data, determine that the second user chat data that includes the same target word or phrase is not offensive language based on output of the plurality of trained machine learning models for the second user chat data, and determine a filter action to be performed for the first user chat data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
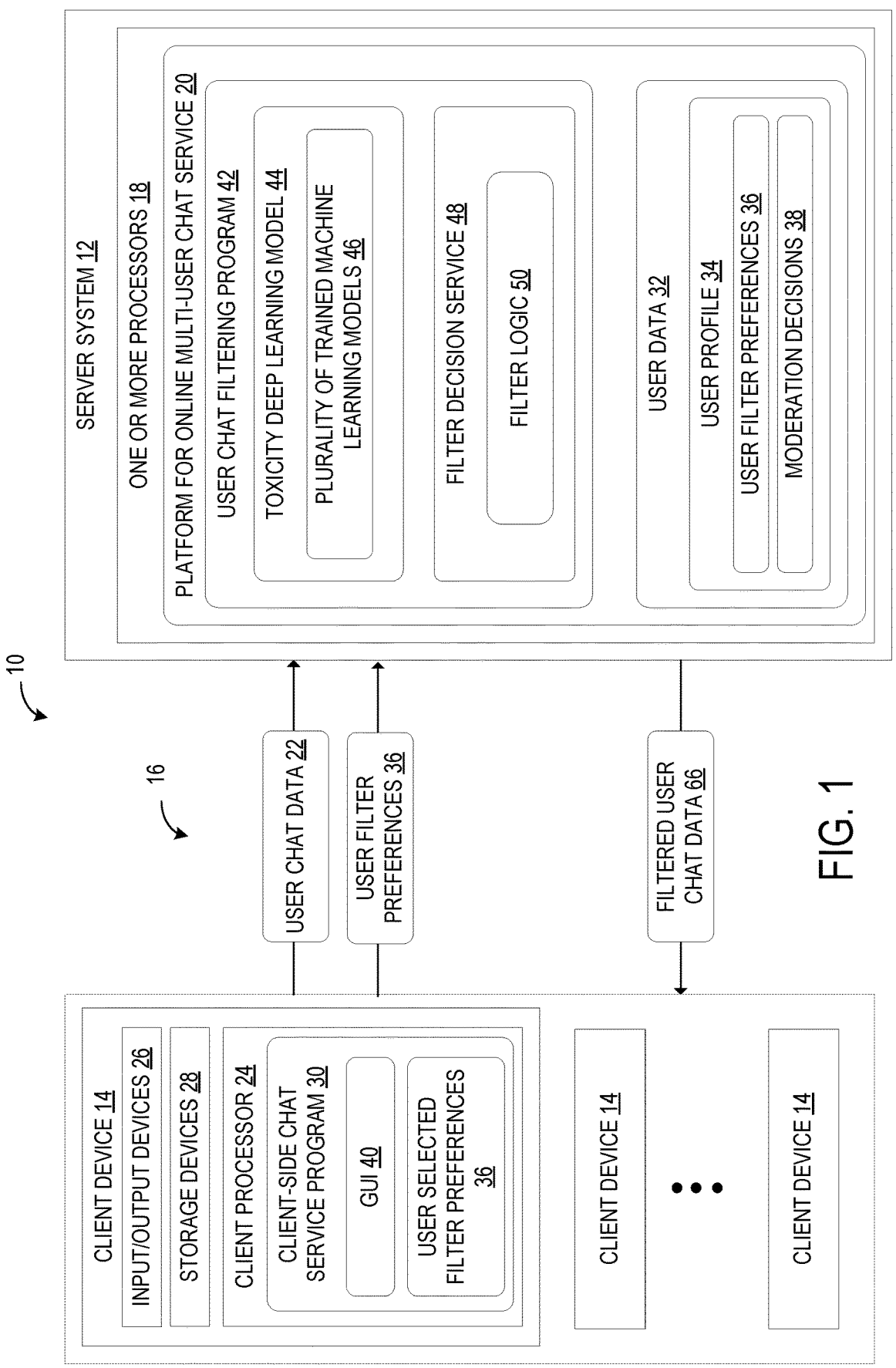
FIG. 1 shows a schematic view of a computer system for performing offensive language chat filtering using a plurality of machine learning models, according to one embodiment of the present disclosure.

The online multi-user application industry, such as online gaming and social networks, has had an increasing user base as more people gain access to Internet infrastructure. The increasing number of users in the industry has led to a more diverse user base that often encompasses users with different tolerances to potentially toxic behaviors such as, for example, the usage of expletives, bullying, and verbally abusive language. It will be appreciated that toxic behavior is used herein to mean a behavior that is perceived to be offensive by the recipient. Since offensiveness is subjective, it can be difficult for players, many of whom do not know each other, to interact online without some offense being taken by participants to the utterances of other participants, whether or not such offense was intentional.

This issue may be exacerbated for online gaming applications where the competitiveness of users playing the game may potentially add an additional layer of complexity. For example, users of these online game applications may react to challenging game dynamics in different ways. Some users may exhibit aggressive expressions that include expletives to channel their frustrations without intending to hurt other users. On the other hand, some users may exhibit more toxic behaviors such as trash-talking and bullying that may degrade the experience of other users in the game. Particularly when players do not know each other and thus do not have an established trust relationship, such an environment filled with potentially toxic expressions in a chat channel can be a barrier to enjoyable play by some participants and may reduce overall participation rates. A conventional approach that merely flags known bad or abusive words may not adequately address the multitude of situations and contexts that can occur in these multi-user applications, and may stifle free expression and censor some content that is not toxic to any individual participant. Over censoring may be unpopular with some participants and further risk decreased participation.

To address the issues discussed above, FIG. 1 illustrates an example computer system for an online multi-user chat service 10. The online multi-user chat service 10 implements a deep learning model for detecting offensive usage of language in different contexts. As will be discussed in more detail below, the deep learning model is configured to differentiate the usage of the same word or phrase that may potentially be offensive when used in one context and non-offensive when used in a different context. The deep learning model learns contextual information that may indicate whether a sentence is potentially mean-spirited and hurtful.

Additionally, as will be discussed in more detail below, the deep learning model may be trained to handle gaming and/or internet specific language that may not typically appear in the content sources used to train conventional models. Further, creative users of online games often create new offensive words or phrases, or masking known offensive words using non-alphabetic characters and other techniques. These techniques for masking offensive words are typically not detected by conventional models, as those new gamer specific offensive words and/or masked offensive words are not typically present in the training data that is conventionally used for training language models.

For example, language models may typically be trained on a variety of content from Internet sources, such as, for example, news articles and other types of website content. These types of content may contain a large amount of underlying knowledge for training the language models, but also typically have a certain architecture around grammar and spelling that is specific to those types of website content. That is, training data sources from news articles posted to a journalism or news website may include a more formalized style of writing and language usage that is different from how users of online games may typically communicate. Thus, these language models trained on content sourced from news articles may potentially miss the nuances of how people talk to each other in an online gaming environment. For example, users may potentially communicate using a language-style similar to the short-hand nature of text messages, as opposed to a perfectly formed sentence that may be more typical of a news article. The deep learning model implemented by the computer system of FIG. 1 may address these challenges discussed above in extracting intent and context from the spurious language usage that may not be decipherable by conventional models.

As shown in FIG. 1, the computer system includes a server system 12 configured to communicate with a plurality of client devices 14 over a computer network 16, such as a wide area network (WAN). The server system 12 may include one or more server devices that include one or more processors 18. In one example, the server system 12 may include a plurality of server devices configured to operate in a cloud computing configuration to perform the functions of the server systems 12 described herein. Each server device of the server system 12 may include other suitable computer components, such as, for example, volatile memory devices, non-volatile memory devices, etc.

The server system 12 is configured to execute a platform 20 for the online multi-user chat service 10 that communicates with a plurality of client devices 14 of users of the online multi-user chat service. The platform 20 for the online multi-user chat service includes functionality for managing the exchange of user chat data 22 between the plurality of client devices 14 that may be owned and operated by separate users of the online multi-user chat service.

Each client device 14 may include a client processor 24, input and output devices 26, volatile and non-volatile storage devices 28, and other suitable computer components. The input and output devices 26 may include input devices such as, for example, a mouse and keyboard, a microphone, a touch screen, etc., and output devices such as, for example, speakers, displays, etc. The client devices 14 may take any suitable form of personal computer device such as laptop computer devices, desktop computer devices, mobile phone devices, tablet computer devices, wearable computer devices, gaming console devices, etc.

As illustrated in FIG. 1, the client processor 24 of each client device 14 may be configured to execute a client-side chat service program 30 configured to communicate with the platform 20 for the online multi-user chat service 10 run by the server system 12. The multi-user online chat service 10 may take the form of a social network, an online game, a chat platform that interfaces with other applications, and other types of services that exchange chat data between users in real-time. In one example, the platform for the online multi-user chat service may include functions for integrating the online multi-user chat service with multiple separate applications such that the user chat data 22 may be exchanged between users that are operating any of the multiple separate applications. The user chat data 22 may be exchanged between users of the platform in real-time, and stored on the platform 20 such that users may view relevant user chat data received from other users at a suitable time.

In one example, the platform 20 for the online multi-user chat service 10 may store user data 32 for users of the plurality of client devices 14. The user data 32 may include user profiles 34 associated with each user of the client devices 14. Each user profile 34 may include an associated username and log-in credentials for a user of a client device 14 that has signed-up on the platform 20 for the online multi-user chat service. Each user profile 34 may also store user settings and preferences for the user, such as user filter preferences 36 that may indicate the user's preferred degree of filtering for the user chat data 22 that is presented to that user. The user profiles 34 may also include moderation decisions 38 that have been applied to each user profile 34 by the platform 20 for the online multi-user chat service, such as, for example, chat restrictions, temporary or permanent bans, etc. These moderation decisions 38 may be applied automatically based on detected offensive language usage and/or applied manually by moderators. The platform 20 for the online multi-user chat service may apply platform-wide filtering on user chat data 22 according to rules and protocols of the platform 20 in addition to the user filter preferences 36 associated with each individual user.

Each user may log into an associated user profile 34 stored on the platform for the online multi-user chat service 20 via the client-side chat service program 30 executed on the user's client device. In some examples, the client-side chat service program 30 may be code that is executed within a browser. In other examples, the client-side chat service program 30 may be an application program stored in non-volatile memory of the client device 14. The client-side chat service program 30 may include a graphical user interface (GUI) 40 that is presented via an output device 26 of the client device 14, such as, for example, a display device. The GUI 40 may include GUI components for receiving input from the user. In one example, the user may select one or more user filter preferences 36 that will be sent to the server system 12 and stored in the user profile 34 for the user. The user filter preferences 36 may include indications for types of offensive language to be filtered for that user, such as, for example, profanity usage, hate speech, bullying, racism, sexism, etc. User chat data 22 that is relevant to the user may also be presented via the GUI 40 of the client-side chat service program 30.

To perform the filtering of the user chat data 22, the one or more processors 18 of the server system 12 may be configured to execute a user chat filtering program 42 that performs filter actions for the user chat data 22 exchanged on the platform 20 for the online multi-user chat service 10. The user chat filtering program 42 may perform different types of filter actions depend on a severity of the offensive language. In one example, the user chat filtering program 42 may apply individual filtering for user chat data 22 that is sent to each client device 14 based on the user filter preferences 36 indicated in the user profiles 34 associated with those client devices 14. In other examples, the user chat filtering program 42 may filter out user chat data 22 across the platform 20, and/or may apply moderation decisions 38 on the user profile that is involved with user chat data 22 that is determined to contain severe offensive language. To determine whether a particular portion of user chat data 22 includes offensive language, the user chat filtering program 42 includes a toxicity deep learning model 44 discussed above.

The toxicity deep learning model 44 may include a plurality of trained machine learning models 46 that will be discussed in more detail below. The user chat filtering program 42 may further include a filter decision service 48 having filter logic 50 for applying filter actions for portions of user chat data 22 and moderation decisions 38 on user profiles 34. After the toxicity deep learning model 44 has processed a target portion of user chat data, such as, for example, one sentence or chat entry from a user, the filter decision service 48 may determine a filter action to be performed for target portions of user chat data from based on output of the plurality of trained machine learning models 46 for those target portions of user chat data.

The client-side chat service program 30 executed by the client device 14 receives the user chat data 22 that is filtered based on the determined filter action. In one example, the user chat data 22 is filtered by the platform 20 before being sent to the computer device 14. In another example, the client-side chat service program 30 may be configured to perform the filtering on received user chat data 22. In this example, the client-side chat server program 30 may be configured to receive both the user chat data 22 and output from the plurality of trained machine learning models 46 executed by the platform 20 for the user chat data 22. The client-side chat service program 30 may include logic to determine a filter action to be performed on the user chat data 22 based on the output from the plurality of trained machine learning models 46 and the user selected filter preference 36. It should be appreciated that the filter actions being performed may include both platform-side and client-side filter actions.

Figure 2:
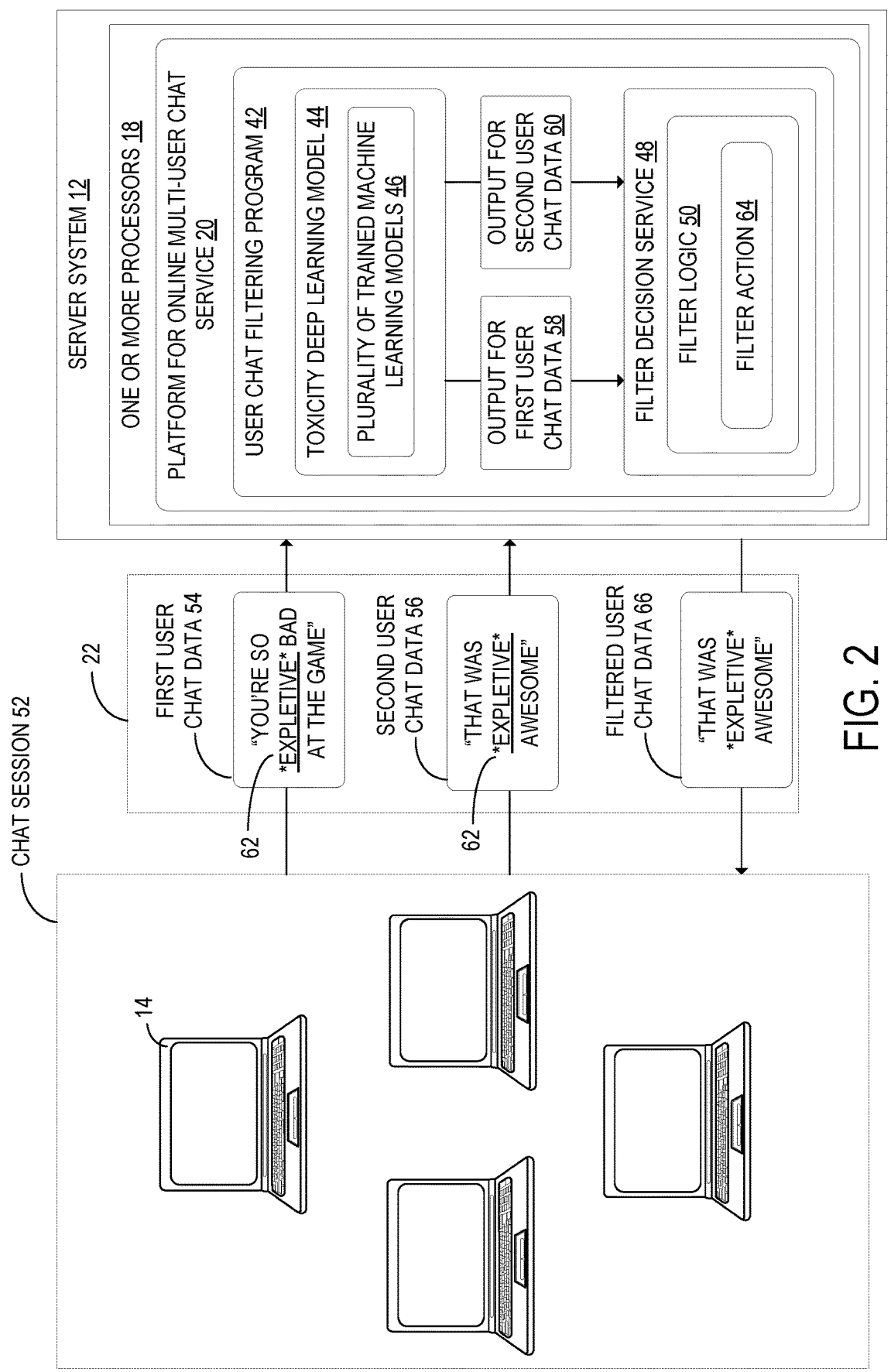
FIG. 2 shows an example of determining different filter actions for two different portions of user chat data that include the same profanity based on output from the plurality of machine learning models implemented by the computer system of FIG. 1.

FIG. 2 shows an example of a filter actions being performed on portions of user chat data by the platform 20. In the illustrated example, a plurality of client devices 14 are engaged in a chat session 52 that is hosted by the platform 20 for the online multi-user chat service 10. Within the chat session 52, the plurality of client devices 14 may exchange user chat data 22, and the platform 20 may filter the exchanged user chat data using the user chat filtering program 42.

During the chat session 52, each client device 14 sends input received from the user of that client device to the server system 12 in the form of the user chat data 22. The server system 22 receives the user chat data 22 for the chat session 52 between the plurality of client devices 14. In the illustrated example, the user chat data 22 received during the chat session 52 includes two portions of chat data, a first user chat data 54 and a second user chat data 56.

The first user chat data 54, which may be received from a first user operating one of the plurality of client devices 14, includes the statement "You're so *Expletive* bad at the game". In addition to containing profanity, the overall intent and sentiment of the statement may be interpreted as bullying the recipient of the message. On the other hand, the second user chat data 56, which may be received from a second user or from the same first user at a different point in time, includes the statement "That was *Expletive* awesome". It should be noted that the second user chat data 56 includes the same word or phrase indicated by the term "*Expletive*" as the first user chat data 54. However, the overall intent and sentiment of the statement may be interpreted as being positive and encouraging, even though the sentence contains profanity. Thus, even though both statements include profanity, the first user chat data 56 may be considered to include more severe offensive language than the second user chat data due to the overall intent and sentiment of the statements.

However, conventional systems would typically filter out both the first user chat data 54 and the second user chat data 56 as both containing profanity, and do not have a method of distinguishing a severity of toxicity or a difference in intent between the two statements. To address this issue, the user chat filtering program 42 of the platform 20 is configured to process the first user chat data 54 and the second user chat data 56 using the plurality of trained machine learning models 46. The output for the first user chat data 58 and the output for the second user chat data 60 from the plurality of trained machine learning models 46 are sent to the filter decision service 48. The particular architecture and types of outputs of the plurality of trained machine learning models 46 will be discussed in more detail below.

The filter decision server 48 is configured to determine filter actions to be performed based on the filter logic 50 and the outputs for the first and second user chat data 58, 60. In the illustrated example, the filter decision service 48 may determine that the first user chat data 54 that includes a target word or phrase 62 (e.g. the word represented as *Expletive*) is offensive language based on output 58 of the plurality of trained machine learning models 46 for the first user chat data 54, and may determine that the second user chat data 56 that includes the same target word or phrase 62 is not offensive language based on output of the plurality of trained machine learning models 46 for the second user chat data 56. The filter decision service 48 may then determine a filter action 64 to be performed for the first user chat data 54. In the illustrated example, the filter action 64 includes filtering out the first user chat data 54, and sending the filtered user chat data 66 that does not include the first user chat data 54 to the plurality of client devices 14 in the chat session 52. It should be appreciated that other filter actions 64 may be performed optionally or in addition to the illustrated filter action. For example, the filter action 64 may include a chat restriction and/or a ban for the user profile 34 associated with the user that send the first user chat data 54. As another example, the filter action 64 may include filtering out specific words or phrases within the first user chat data 54 rather than the entire statement of the first user chat data 54.

Figure 3:
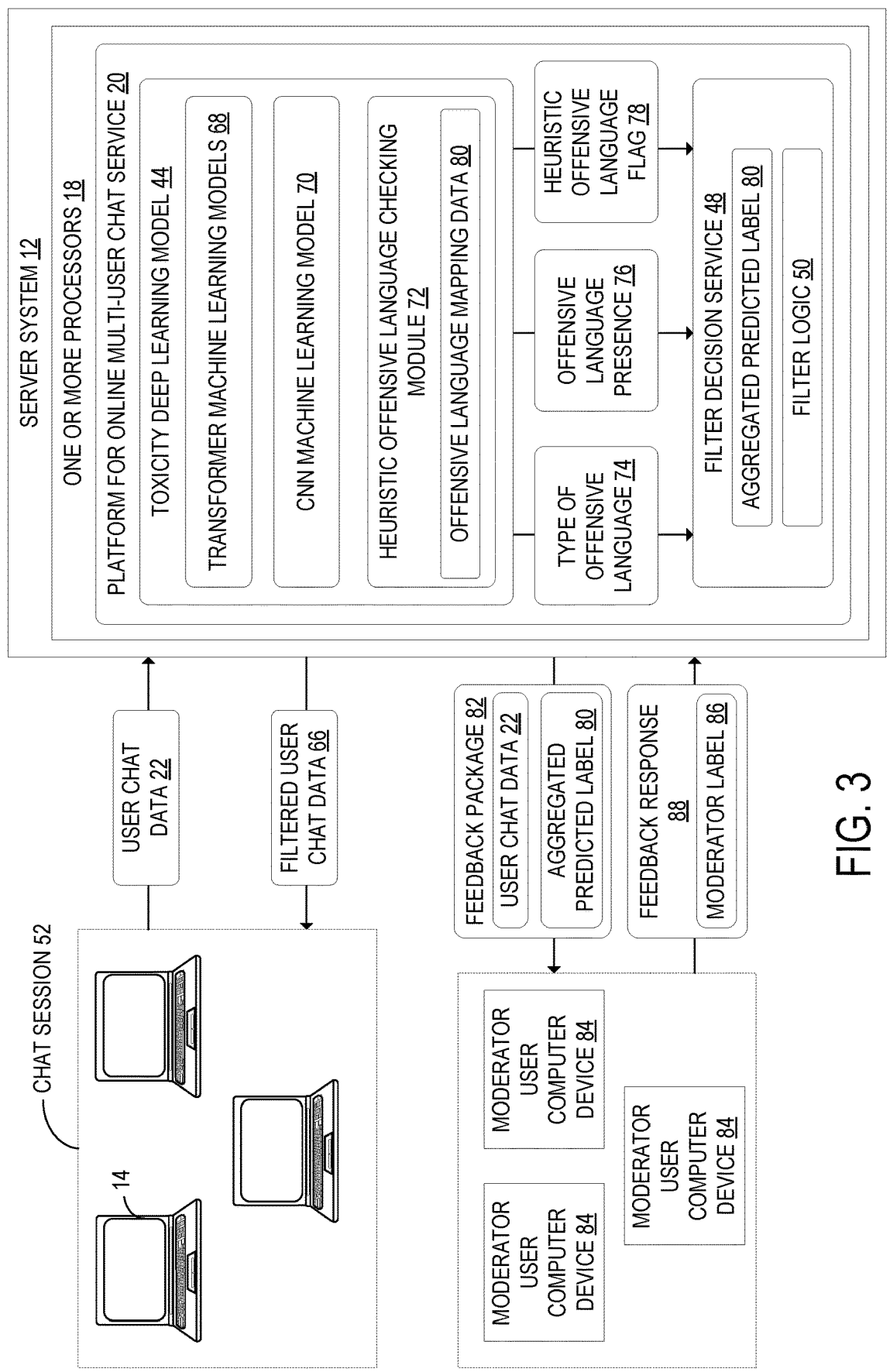
FIG. 3 shows several example machine learning models for the plurality of machine learning models and a moderator-based feedback mechanism implemented by the computer system of FIG. 1.

FIG. 3 shows an example of different machine learning models that may be included in the plurality of trained machine learning models 46 of the toxicity deep learning model 44. As shown, the user chat data 22 received from the plurality of client devices 14 in the chat session 52 may be processed by the toxicity deep learning model 44. The toxicity deep learning model 44 may include one or more of a transformer machine learning model 68, a convolutional neural network (CNN) machine learning model 70, and a heuristic offensive language checking module 72. The filter decision service 48 receives respective outputs from the transformer machine learning model 68, the CNN machine learning model 70, and the heuristic offensive language checking module 72.

In one example, the transformer machine learning model 68 may be configured to determine a predicted label for a type of offensive language 74 associated with a target portion of the user chat data 22. The types of offensive language may, for example, include a profanity type, a bullying type, an adult language type, and a hate speech type that may include a sexism and/or racial hate speech type. A specific architecture for the transformer machine learning models 68 will be described in more detail below.

The CNN machine learning model 70 may be configured to determine a predicted label for an offensive language presence 76 for a target portion of the user chat data 22. The predicted value for the offensive language presence 76 may indicate whether the target portion of the user chat data 22 includes words or phrases that are offensive in nature. A specific architecture for the CNN machine learning model 70 will be described in more detail below.

The heuristic offensive language checking module 72 may be configured to determine a value for a heuristic offensive language flag 78 for the target portion of the user chat data 22. The heuristic offensive language flag 78 may indicate whether a word or phrase in the target portion of the user chat data is mapped to a type of offensive language using heuristically generated offensive language mapping data 80, which includes a mapping between words or phrases and predicted labels for a type of offensive language. These types of offensive language may be the same or similar to the types of offensive language determined by the transformer machine learning models 68. The offensive language mapping data 80 may be manually generated by an administrator of the platform 20, generated using crowd-source techniques, or generated using another type of heuristic method. The offensive language mapping data 80 may directed map a word or phrase to a type of offensive language. For example, known racial slurs may be mapped to a hate speech type of offensive language.

As illustrated in FIG. 3, the filter decision service 48 receives output from the plurality of machine learning models 46, which may include predicted labels for one or more types of offensive language 74, an offensive language presence 76, and/or a value for a heuristic offensive language flag 78.

The filter decision service 48 may aggregate these outputs from the plurality of machine learning models 46 to determine an aggregated predicted label 80 for offensive language for the portion of user chat data being processed. The aggregated predicted label 80 for the portion of user chat 22 may be determined via any suitable weighting technique. In one example, if at least one of the outputs from the toxicity deep learning model 44 indicates that the portion of user chat data 22 includes offensive language, then the filter decision service 48 may be configured to generate the aggregated predicted label 80 to indicate that the portion of user chat data 22 includes offensive language.

In another example, the filter decision service 48 may be configured to perform a weighted combination of confidence values of the outputs from the toxicity deep learning model 44. However, it should be appreciated that other types of weighting procedures may be used to generate the aggregated predicted label 80 based on the outputs of the plurality of machine learning models 46 and the heuristic offensive language checking module 72. The filter decision service 48 may then be configured to determine a filter action to be performed on the portion of user chat data based on the aggregated predicted label 80, such as, for example, filtering out the portion of user chat data, applying a ban to a user profile associated with the portion of user chat data, or another suitable filter action.

As illustrated in FIG. 3, the platform 20 may include a feedback mechanism that elicits feedback from moderators for predicted labels determined by the toxicity deep learning model 44 and the filter decision service 48. In this example, the user chat filtering program 42 may be further configured to generate a feedback package 82 that includes a target portion of the user chat data 22 that was processed by the toxicity deep learning model 44. The feedback package 82 further includes the output of the plurality of trained machine learning models 46 for the target portion of user chat data 22. In the illustrated example, the feedback package 82 includes the aggregated predicted label 80 to represent the output from the plurality of trained machine learning models 46. However, in another example, the feedback package 82 may include each output from each machine learning model, such as the predicted labels for the types of offensive language 74, the predicted label for offensive language presence 76, and/or the value for the heuristic offensive language flag 78.

The server system 12 sends the feedback package 82 to one or more moderator user computer devices 84. Each moderator user computer device 84 may be operated by a moderator user that has been approved by the platform 20. For example, the moderator users may be employees or contractors of the entity running the platform 20. As another example, the moderator users may be vetted or trusted users of the platform 20.

Each moderator user computer device 84 may present the feedback package 82 to the moderator user, and receive an input from the moderator user that includes a moderator label 86 for the target portion of the user chat data 22. In one example, the moderator label 86 indicates a moderator selected label of offensive language for the target portion of the user chat data 22, such as, for example, a type of offensive language, an offensive language presence, etc. In another example, the input received from the moderator user may indicate whether the aggregated predicted label 80, or the predicted labels in the outputs from the plurality of trained machine learning models 46 are correct or incorrect.

The server system 12 may be configured to receive a feedback response 88 from the moderator user computer device 84 that includes the moderator label 86 and/or other types of moderator inputs. The server system 12 may be configured to perform batched feedback training on the plurality of trained machine learning models 46 based on the received feedback response 82 from the moderator user computer device 84.

Figure 4:
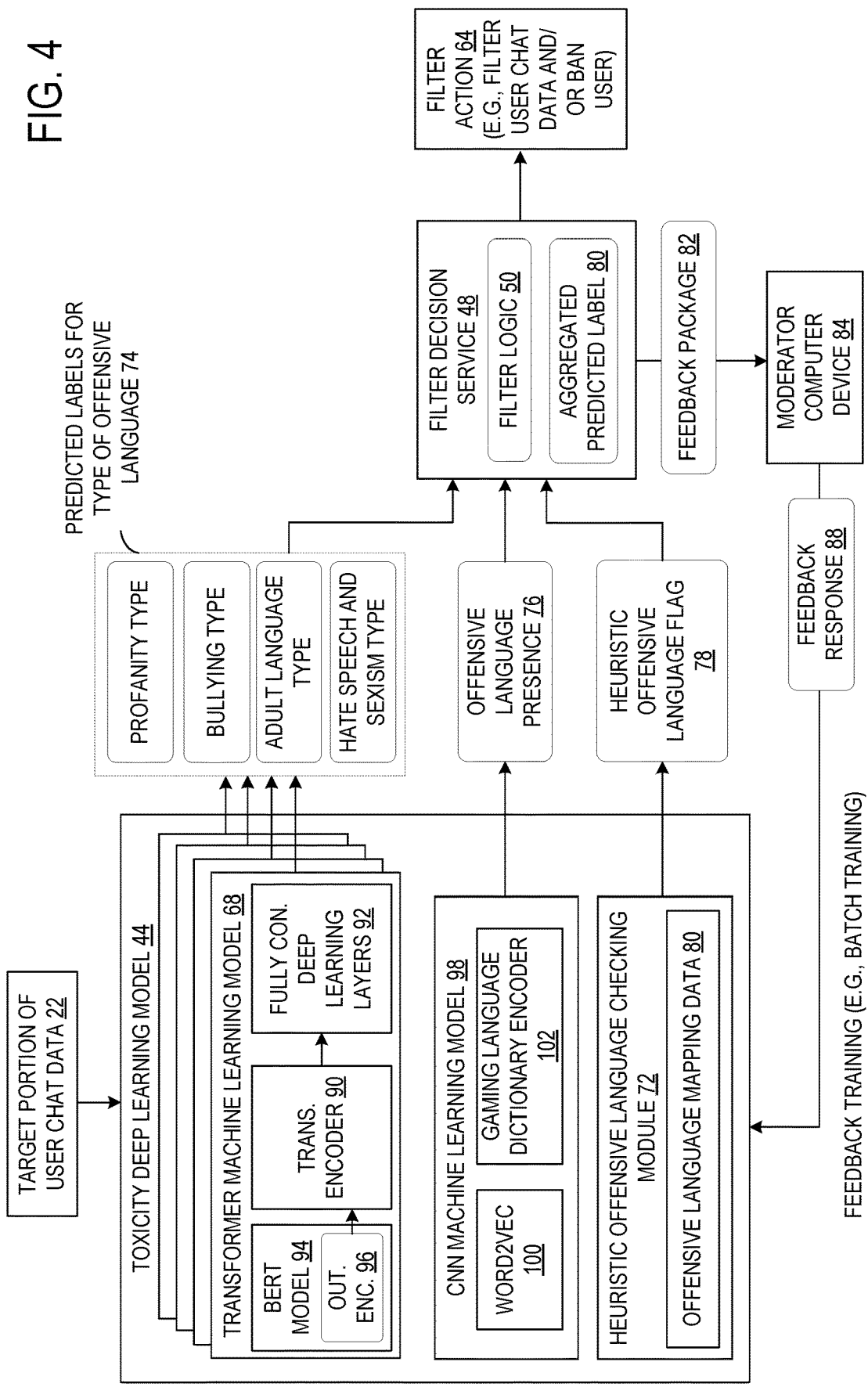
FIG. 4 shows a dataflow for processing a target portion of user chat data using the plurality of machine learning models and determining a filter action to be performed based on outputs of the plurality of machine learning models implemented by the computer system of FIG. 1.

FIG. 4 shows a dataflow of the user chat filtering program 42 from receiving user chat data 22 at run-time of a chat session 52 to determining a filter action 64 to be performed for the user chat data 22. The user chat data 22 from run-time of a chat session 52 for a plurality of client device 14 is received at the server system 12 and passed to the toxicity deep learning model 44. The toxicity deep learning model 44 separately processes that portion of user chat data 22 using the plurality of trained machine learning models 46.

In the illustrated example, the toxicity deep learning model 44 includes at least one trained transformer machine learning model 68 that includes a transformer encoder 90 and a plurality of fully connected deep learning layers 82. The transformer encoder 90 may include a self-attention mechanism that takes input encodings and weighs the relevance among those input encodings to each other to generate output encodings. In some examples, the transformer encoder 90 may further include a feed-forward neural network that may perform further processing on each output encoding.

In one example, the transformer encoder 90 is configured to receive an output encoding 96 from a bidirectional encoder representations from transformers (BERT) model 94 that processed the target portion of user chat data 22 from the platform 20 for the online multi-user chat program. However, in some examples, the transformer encoder 90 may receive output encodings from other types of models that are trained on large general purpose datasets to perform pre-processing on the user chat data in a similar manner to BERT models 94. As a few other examples, the transformer encoder 90 may receive output encodings from a Generative Pre-trained Transformer 2 (GPT-2) model, a GPT-3 model, an XLNet model, as well as other models that have been derived from BERT models such as RoBERTa, etc. It should be appreciated that these models are merely exemplary, and that the transformer encoder 90 may be configured to receive output encodings from other types of models that provide similar functionality as the BERT model 94.

The BERT model 94 is a deep learning model for natural language processing tasks. The BERT model 94 is a multi-layer bidirectional model includes multiple transformer-based encoders. BERT models 94 are typically trained using Masked Language Modeling. In Masking Language Modeling, a portion of input tokens in a sentence are masked at random, and the BERT model 94 is trained to predict those masked input tokens. The Masked Language Modeling trains the BERT model 94 to learn contextual meaning between words in sentences such that word representations in the BERT model 94 are dynamically informed by the other words in the sentence.

For example, consider the following two sentences. "The dog ran to fetch the ball." "Many people went to the ball to dance." In other models such as Word2Vec, each word has a fixed representation that is not dynamically dependent on a context of the sentence that includes the word. Thus, in a Word2Vec model, the word "ball" from both sentences would have the same word embedding. In contrast, after processing both sentences, the BERT model would generate different embeddings for the word "ball" in each sentence. In this manner, the word representations for each word in a sentence capture a feature representation of the sentence as a whole, rather than only considering each word individually.

With reference to FIG. 2, even though the sentence "You're so *Expletive* bad at the game" and the sentence "That was *Expletive* awesome" both contain the same word represented as *Expletive*, the BERT model 94 will produce different representations for both occurrences as the surrounding context of the sentences are different. As the representations for the word *Expletive* will be different in the output from the BERT model 94 for the two sentences, the transformer machine learning model that receives the output from the BERT model 94 may be suitably trained to distinguish between the two different contexts. That is, the transformer machine learning model 94 may learn that the sentence "You're so *Expletive* bad at the game" is an offensive usage of language, while the sentence "That was *Expletive* awesome" is not an offensive usage of language, even though they both contain the same profanity.

Turning back to FIG. 4, the output of the transformer encoder 90 is passed to the fully connected deep learning layers 92 that are configured to output a predicted label for a type of offensive language 74 for the target portion of user chat data 22. In the example illustrated in FIG. 4, the at least one trained transformer machine learning model 68 is one of a plurality of trained transformer machine learning models 68. As a specific example, the toxicity deep learning model 44 may include four separate transformer machine learning models 68 that include the same components and functions described herein. However, it should be appreciated that any suitable number of transformer machine learning model 68 may be used, such as 2, 3, 5, 10, etc.

Each of the plurality of trained transformer machine learning models 68 is respectively trained to predict labels for a different respective type of offensive language 74. In the example illustrated in FIG. 4, there are four transformer machine learning models 68 that are respectively trained to predict one of a plurality of profanity types of offensive language, such as a bullying type of offensive language, an adult language type of offensive language, and a hate speech type of offensive language. The hate speech type of offensive language may include one or more of a racial hate speech type of offensive language and/or a sexism type of offensive language.

The profanity type of offensive language may indicate an offensive usage of profanity, such as the scenario described above with reference to FIG. 2. The bullying type of offensive language may indicate that the user chat data has a negative intent and sentiment, such as demeaning a recipient. The bullying type of offensive language does not necessarily require the use of profanity, and may include any suitable type of bullying language. The adult language type of offensive language may indicate whether the user chat data includes adult subjects that should be filtered out of the chat presented to younger users, such as, for example, sexual subjects, violent subjects, etc. The hate speech type of offensive language may indicate that the user chat data includes racial slurs, gender-based slurs, or other types of hate speech. It should be appreciated that the types of offensive language 74 described above are merely exemplary, and that other types of offensive language not specifically described herein may be predicted by the transformer machine learning models 68.

As illustrated in FIG. 4, the plurality of trained machine learning models 46 of the toxicity deep learning model 44 may include at least one trained convolutional neural network (CNN) machine learning model 98 configured to receive input embeddings from a Word2Vec model 100 that processed the target portion of user chat data 22 from the platform 20. As discussed above, the Word2Vec model generates representations for words that are not dependent upon the context of the sentence that contains the word. Thus, the word "ball" will have the same representation regardless of context. The CNN machine learning model 98 may be trained to learn which word representations output from the Word2Vec model are associated with offensive language. After receiving the input embeddings from the Word2Vec model for a target portion of user chat data 22, the CNN machine learning model 90 is configured to output a predicted label for an offensive language presence for the target portion of user chat data. That is, the predicted label from the CNN machine learning model 98 indicates whether the user chat data 22 includes any words that are associated with offensive language.

The Word2Vec model typically includes word representations for a wide range of words that may be found in a dictionary for the language. However, users of gaming applications may often create new words that are not typically included in a dictionary. For example, gaming slang such as "Noob", "Inting", etc., may potentially not be included in models such as Word2Vec. Further, users may often combine separate words, or mask words using alphanumeric symbols, or use other creative techniques that are human-readable, but may potentially not be appropriately represented in models such as Word2Vec.

To address these issues, the trained CNN machine learning model 98 may be configured to receive input embeddings from a gaming language dictionary encoder 102. The gaming language dictionary encoder 102 may be cross-entropy trained on a corpus of user chat data that has been collected previously. The cross-entropy training may train the gaming language dictionary encoder to identify news words from the corpus of user chat data. The gaming language dictionary encoder 102 may further encode these new words with separate word representations similarly to the Word2Vec model. The input embeddings from both the Word2Vec model and the gaming language dictionary encoder 102 may be concatenated together and passed to the CNN machine learning model 98. In this manner, the total word dictionary size that may be mapped to separate word representations in the model may be increased to cover the many different creative words and masking techniques used by gamers.

In one example, the toxicity deep learning model 44 may further include the heuristic offensive language checking module 72 that includes offensive language mapping data 80 for a mapping between words or phrases and predicted labels for a type of offensive language. The heuristic offensive language checking module 72 may output a value for a heuristic offensive language flag 78. The heuristic offensive language checking module 72 may be manually generated by moderators to flag specific words or phrases that are offensive.

As illustrated in FIG. 4, the filter decision service 48 is configured to receive the outputs of each component of the toxicity deep learning model 44. The filter decision service 48 may receive predicted labels from the plurality of transformer machine learning models 68 for each type of offensive language 74, a predicted label from the CNN machine learning model 98 for the offensive language presence 76, and/or a value for the heuristic offensive language flag 78. The filter decision service 48 may process each of these outputs, and generate an aggregated predicted label 80. The filter decision service 48 may then determine a filter action 64 to be performed based on the aggregated predicted label 80 using filter logic 50.

As discussed above, a feedback package 82 that includes the aggregated predicted label 80 and the associated portion of user chat data 22 may be sent to one or more moderator computer devices 84. A feedback response 88 may then be received from those moderator computer devices 84, and used to perform batch training on the toxicity deep learning model 44 and each of the plurality of trained machine learning models.

Figure 5:
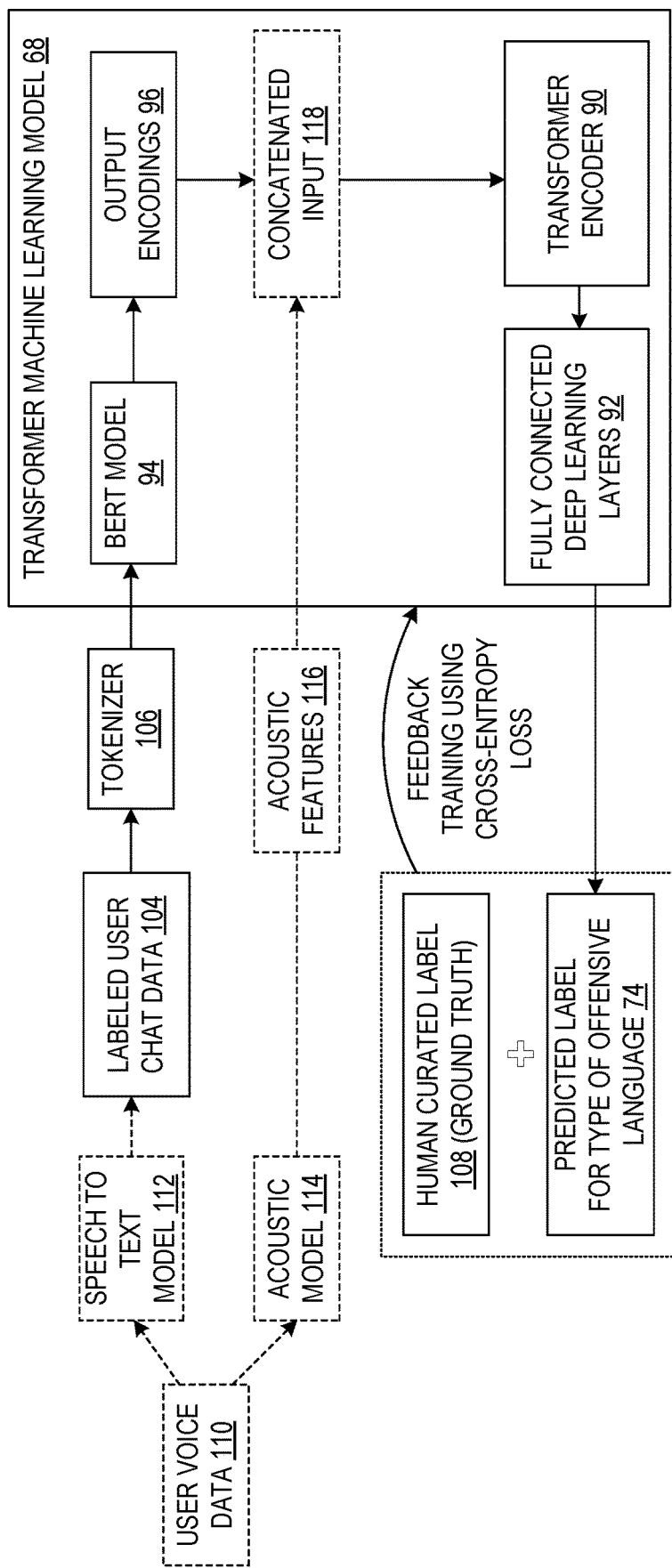
FIG. 5 shows a training process for a transformer machine learning model of the plurality of machine learning models implemented by the computer system of FIG. 1.

FIG. 5 illustrates an example training process for the transformer machine learning models 68. The transformer machine learning models 68 are trained using a corpus of labeled user chat data 104 that includes units of user chat data (e.g. A sentence) that are paired with a human curated label 108 (e.g. Ground truth). The labeled user chat data 104 may be collected via any suitable technique. For example, the server system 12 may be configured to provide a reporting system that receive reports from client devices 14. These reports may indicate a unit of user chat data and a user selected type of offensive language, such as profanity, adult language, bullying, hate speech, sexism, etc. These user reports may be reviewed by moderators and collected into the corpus of labeled user chat data 104.

As illustrated, each unit of chat data in the labeled user chat data 104 is typically processed by a tokenizer 106 that breaks down the unit of chat data into a sequence of recognized units which may include full words, subwords, and characters. The tokenized unit of chat data is passed to the BERT model of the transformer machine learning model 68. As discussed above, the BERT model 94 typically pre-trained using Masked Language Modeling. The output encodings 96 from the BERT model 94 are passed to the transformer encoder 90, which is fine tuned for a specific type of offensive language. The output from the transformer encoder 90 is passage to a fully connected deep learning layers 92 that perform classification and outputs a predicted label for the type of offensive language 74. The predicted label is used with the human curated label 108 (e.g. ground truth) associated with the unit of user chat data being processed to perform cross-entropy loss feedback training on the transformer machine learning model 68. In one example, the feedback training may be performed on the transformer encoder 90 and the fully connected deep learning layers 92 separately from the BERT model 94. In another example, the combination of the BERT model 94, transformer encoder 90, and the fully connected deep learning layers 92 may be trained together. Each transformer machine learning model 68 may be separate fine-tuned in this manner for respective types of offensive language 74, such as profanity, bullying, adult language, hate speech, and sexism.

In one example, the transformer machine learning model 68 may be further trained using acoustic data. For example, the users of the client device 14 may be inputting the user chat data 22 via speech that is captured using a microphone. The voice data 110 captured by the microphone may be sent to the server system 12, and processed using an automatic speech recognition (ASR) machine learning model. The ASR machine learning model may include a speech to text model 112 that generates target portions of the user chat data 22 based on target portions of user voice data 110 received from the platform 20. The ASR machine learning model may further include an acoustic model 114 that generates a set of acoustic features 116 for the target portion of user voice data 110.

Each transformer machine learning model 68 may be trained to predict labels for the types of offensive language 74 for a target portion of user voice data 110 based on both the text for the target portion of user voice data generated by the speech to text model 112 and the acoustic features of the target portion of user voice data 110 generated by the acoustic model 114. Specifically, during training and runtime, rather than only passing the output encodings 96 from the BERT model 94 to the transformer encoder, a concatenated input 118 is passed to the transformer encoder 90. The concatenated input 118 for the target portion of user voice data being 110 processed includes both the output encoding 96 from the BERT model 84 that processed the target portion of user chat data generated by the speech to text model 112 for the target portion of user voice data 110, and the set of acoustic features 116 generated by the acoustic model 114 for the target portion of user voice data 110.

The transformer encoder 90 and the fully connected deep learning layers 92 are trained to predict the label for the type of offensive language 74 based on both the output encodings 96 and the set of acoustic features 116. In this manner, the transformer machine learning model 68 may learn associations between acoustic features and certain types of offensive language. For example, a bullying type of offensive language such as "You're so *Expletive* bad at the game" may potentially be associated with loud or otherwise angry types of acoustic features 116. A similar architecture may be used at run-time to perform run-time processing of user voice data 110.

Figure 6:
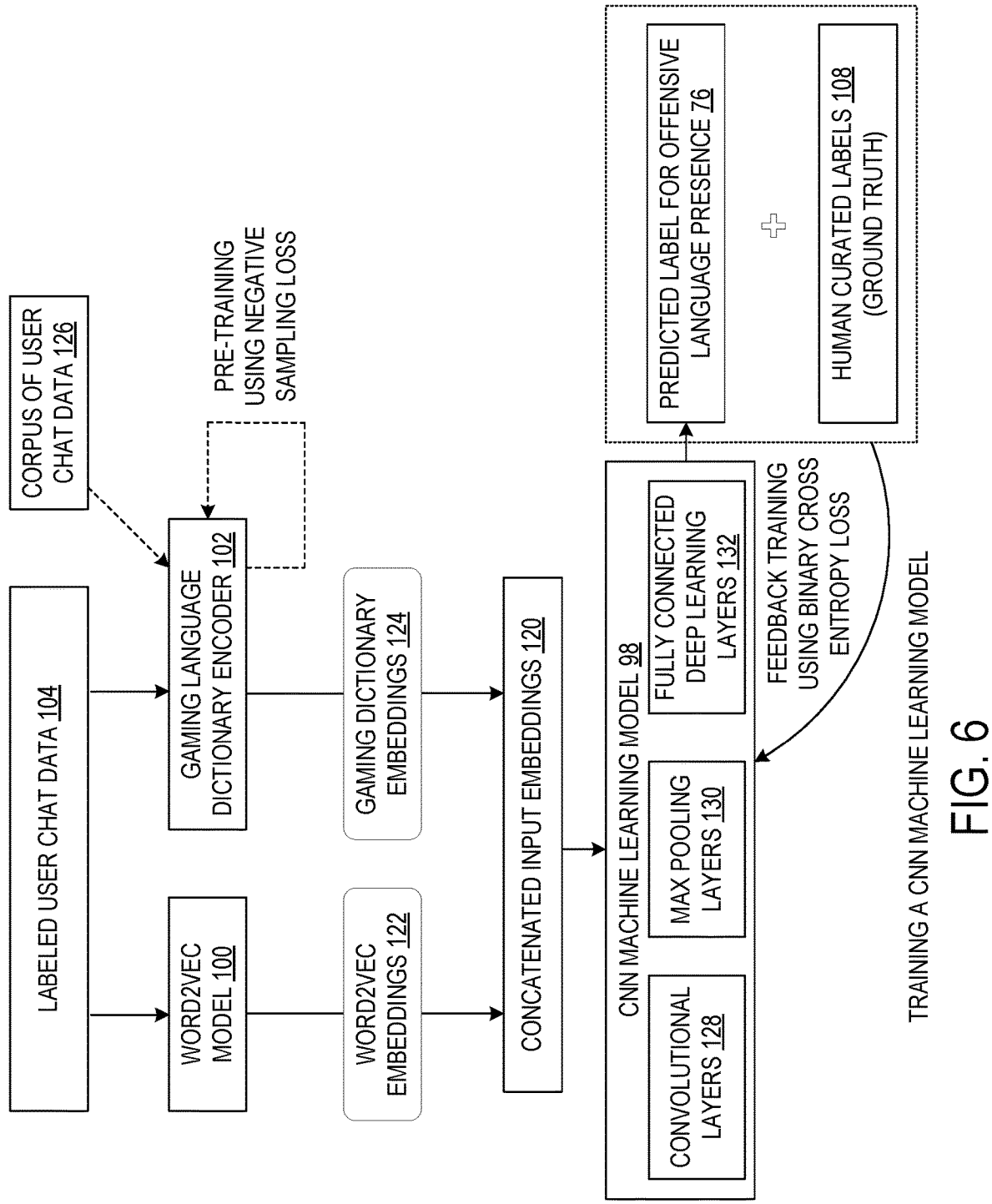
FIG. 6 shows a training process for a convolutional neural network machine learning model of the plurality of machine learning models implemented by the computer system of FIG. 1.

FIG. 6 illustrates an example training process for a CNN machine learning model 98. As shown, the CNN machine learning model 98 receives concatenated input embeddings 120 that include both Word2Vec embeddings 122 from a Word2Vec model 100 and gaming dictionary embeddings 124 from a gaming language dictionary encoder 102. The gaming language dictionary encoder 102 may be pre-trained using negative sampling loss on a corpus of user chat data 126. As discussed previously, the gamer users may often create new words or use masking techniques (e.g. L33T Speak) to mask the intent of the user's language. These gamer words may not be represented in the Word2Vec model 100. Thus, the gaming language dictionary encoder 102 is pre-trained to learn different words that appear in the corpus of user chat data 126 collected from previous chat session or by other chat platforms. After the gaming language dictionary encoder 102 has been pre-trained, the CNN machine learning model 98 as a whole may be trained.

Labeled user chat data 104 that include both units of chat data paired with human curated labels 108 is passed to both the Word2Vec model 100 and the gaming language dictionary encoder 102. Both models generate respective embeddings that include word representations for recognized words in the unit of user chat data. The Word2Vec embeddings 112 and gaming dictionary embeddings 124 are concatenated and passed to the CNN machine learning model 98. In one example, the CNN machine learning model 98 includes three convolution layers 128 and three max pooling layers 130 before a plurality of fully connected deep learning layers 132. The CNN machine learning model 98 determines a predicted label for an offensive language presence 76 (e.g. Offensive or not offensive) for the labeled user chat data 104. The predicted label and an associated human curated label 108 are then used to perform feedback training on the CNN machine learning model 98 using binary cross entropy loss.

Figure 7:
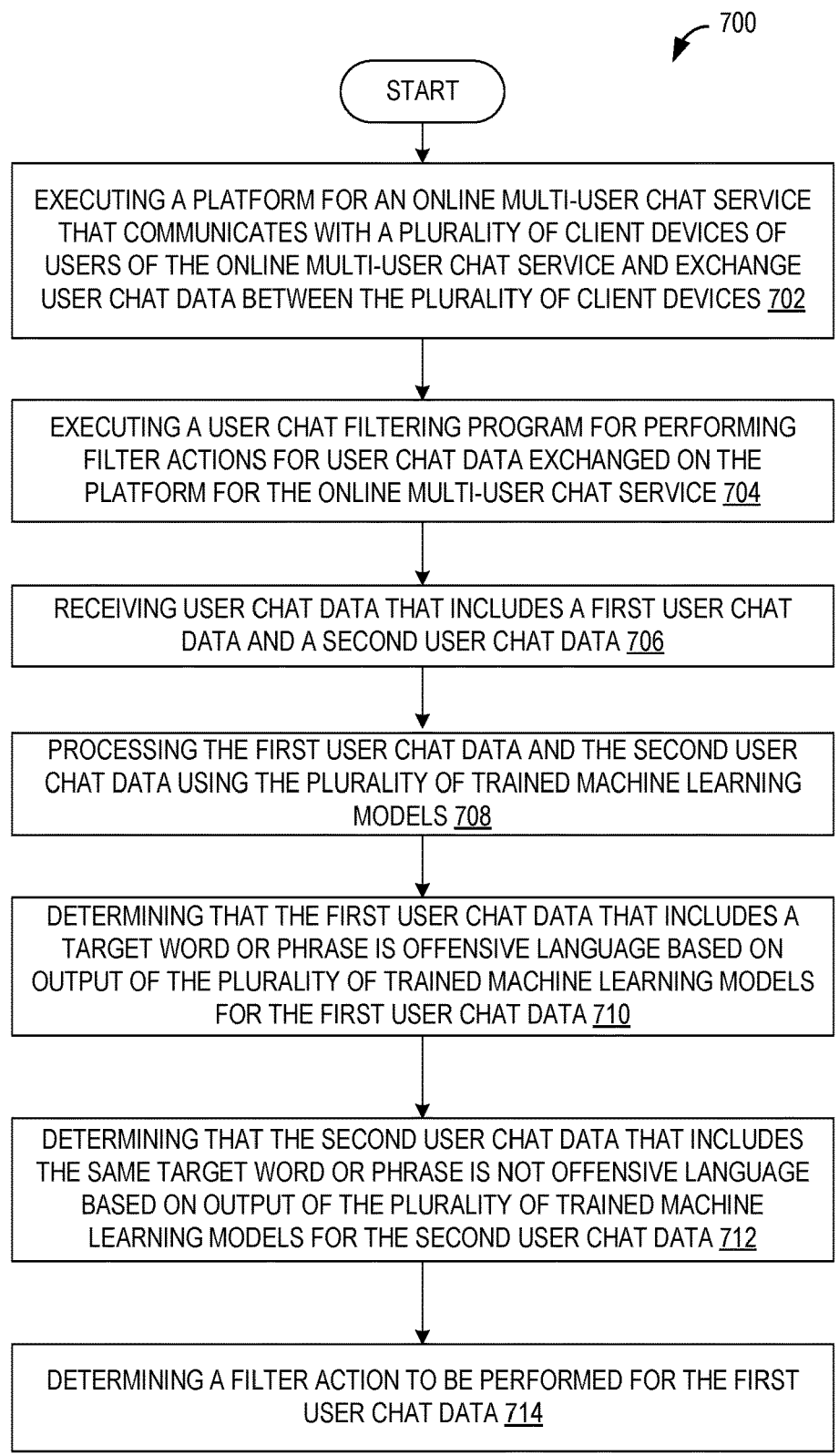
FIG. 7 shows a flowchart for an example method for performing offensive language chat filtering using a plurality of machine learning models.

FIG. 7 shows a flowchart for a computer-implemented method 700. The method 700 may be implemented by the computer system of FIG. 1. The method 700 includes steps for executing a platform for an online multi-user chat service that includes a contextual chat filtering function that uses a plurality of machine learning models.

At step 702, the method 700 may include executing a platform for an online multi-user chat service that communicates with a plurality of client devices of users of the online multi-user chat service and exchange user chat data between the plurality of client devices. The online multi-user chat service may, for example, take the form of a social media application, a game application, a text or communication application, or another type of chat service. The platform may manage a plurality of user profiles for the users associated with each client device. The platform may also manage chat sessions that include a plurality of users.

The platform may analyze user chat data received from the plurality of users, and perform suitable filter actions in real-time based on outputs of a plurality of machine learning models processing the user chat data in real-time.

At step 704, the method 700 may include executing a user chat filtering program for performing filter actions for user chat data exchanged on the platform for the online multi-user chat service. The filter actions may be determined and performed in real-time as users exchange chat data through the platform. The user chat filtering program includes a plurality of trained machine learning models and a filter decision service for determining a filter action to be performed for target portions of user chat data based on output of the plurality of trained machine learning models for those target portions of user chat data. The target portions of user chat data may include individual statements entered via each user into a client-side chat service program.

At step 706, the method 700 may include receiving user chat data that includes a first user chat data and a second user chat data. The platform receives the first user chat data and the second user chat data over a network, such as, for example, a wide area network. In one example, the first user chat data and the second user chat data may be received from two separate users. In another example, the first user chat data and second user chat data may be received from the same user.

At step 708, the method 700 may include processing the first user chat data and the second user chat data using the plurality of trained machine learning models. In one example, the plurality of trained machine learning models includes at least one trained transformer machine learning model that includes a transformer encoder and a plurality of fully connected deep learning layers. The transformer encoder receives an output encoding from a bidirectional encoder representations from transformers (BERT) model that processed the target portion of user chat data from the platform. The fully connected deep learning layers output a predicted label for a type of offensive language for the target portion of user chat data. Further, the at least one trained transformer machine learning model may be one of a plurality of trained transformer machine learning models that are respectively trained to predict labels for a different respective type of offensive language. The types of offensive language may, for example, include a profanity type, a bullying type, an adult language type, and a hate speech type.

In another example, the plurality of trained machine learning models includes at least one trained convolutional neural network (CNN) machine learning model that receives input embeddings from a Word2Vec model that processed the target portion of user chat data from the platform, and outputs a predicted label for an offensive language presence for the target portion of user chat data. The at least one trained CNN machine learning model may further receive input embeddings from a gaming language dictionary encoder that is cross-entropy trained on a corpus of user chat data.

The user chat data may be processed separately by each of the trained machine learning models, and the output of each trained machine learning model may be passed to the filter decision service.

At step 710, the method 700 may include determining that the first user chat data that includes a target word or phrase is offensive language based on output of the plurality of trained machine learning models for the first user chat data. As a specific example, the first user chat data may include the statement "You're so *Expletive* bad at the game". In addition to containing profanity, the overall intent and sentiment of the statement may be interpreted as bullying the recipient of the message.

At step 712, the method 700 may include determining that the second user chat data that includes the same target word or phrase is not offensive language based on output of the plurality of trained machine learning models for the second user chat data. As a specific example, the second user chat data may include the statement "That was *Expletive* awesome". It should be noted that the second user chat data includes the same word or phrase indicated by the term "*Expletive*" as the first user chat data received at step 710. However, the overall intent and sentiment of the statement may be interpreted as being positive and encouraging, even though the sentence contains profanity. Thus, even though both statements include profanity, the first user chat data may be considered to include more offensive language than the second user chat data due to the overall intent and sentiment of the statements.

At step 714, the method 700 may include determining a filter action to be performed for the first user chat data. The filter actions may, for example, include filtering out the user chat data that was determined to include offensive language, filtering out specific words or phrase, temporarily or permanently banning a user that entered the offensive language, or another suitable type of filter action.

The systems and method described above provide techniques for detecting offensive usage of language in different contexts such as by differentiating the usage of the same word or phrase that may potentially be offensive when used in one context and non-offensive when used in a different context. The described systems and method learn contextual information that may indicate whether a sentence is potentially mean-spirited and hurtful, and provides the potential benefit of a chat filtering system that is able to detect a variety of types of offensive language as well was new words that have been created by users.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
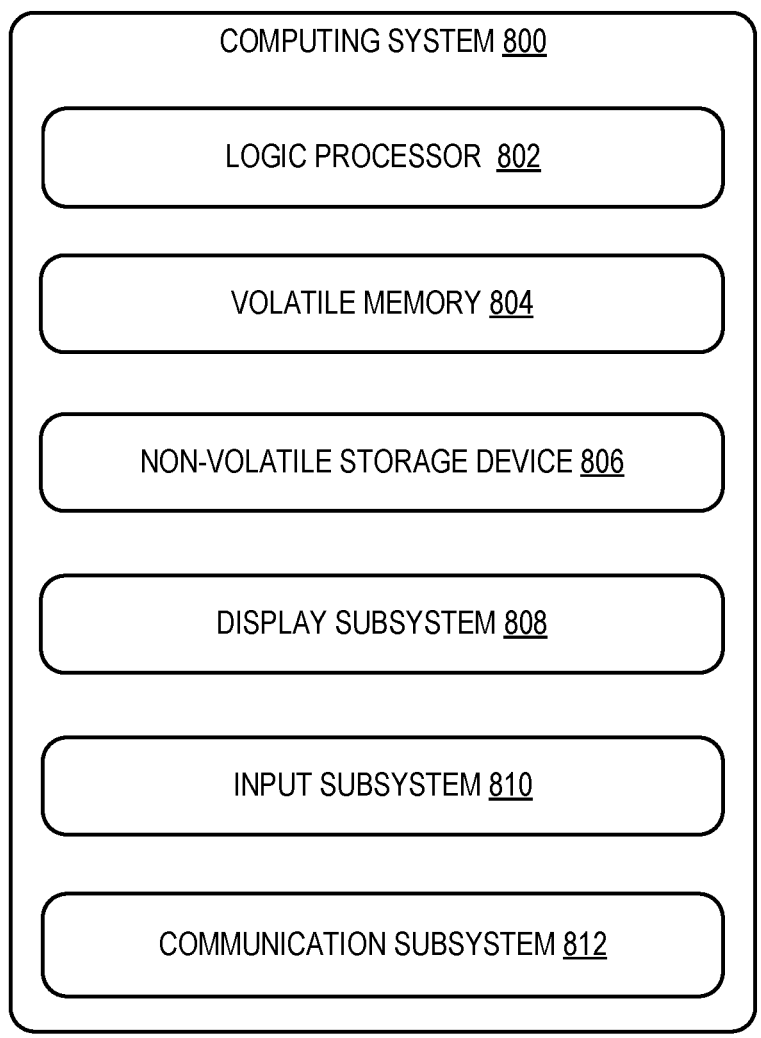
FIG. 8 shows a schematic view of an example computing environment in which the computer system of FIG. 1 may be enacted.

FIG. 8 schematically shows a non-limiting embodiment of a computing system 800 that can enact one or more of the methods and processes described above. Computing system 800 is shown in simplified form. Computing system 800 may embody the computer system described above and illustrated in FIG. 1. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC /ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a server system (12) comprising one or more processors (18) configured to execute a platform (20) for an online multi-user chat service (10) that communicates with a plurality of client devices (14) of users of the online multi-user chat service (10), the platform (20) being configured to exchange user chat data (22) between the plurality of client devices (14). The one or more processors (18) are further configured to execute a user chat filtering program (42) that performs filter actions (64) for user chat data (22) exchanged on the platform (20) for the online multi-user chat service (10), the user chat filtering program (42) including a plurality of trained machine learning models (46) and a filter decision service (48) that determines a filter action (64) to be performed for target portions of user chat data (22) based on output of the plurality of trained machine learning models (46) for those target portions of user chat data (22). The user chat filtering program (42) is configured to receive user chat data (22) that includes a first user chat data (54) and a second user chat data (56), process the first user chat data (54) and the second user chat data (56) using the plurality of trained machine learning models (46), determine that the first user chat data (54) that includes a target word or phrase (62) is offensive language based on output of the plurality of trained machine learning models (46) for the first user chat data (54), determine that the second user chat data (56) that includes the same target word or phrase (62) is not offensive language based on output of the plurality of trained machine learning models (46) for the second user chat data (56), and determine a filter action (64) to be performed for the first user chat data (54).

This aspect provides the potential benefit of improved detection of offensive usage of language in different contexts such as by differentiating the usage of the same word or phrase that may potentially be offensive when used in one context and non-offensive when used in a different context.

In this aspect, additionally or alternatively, the plurality of trained machine learning models may include at least one trained transformer machine learning model that includes a transformer encoder and a plurality of fully connected deep learning layers. The transformer encoder may be configured to receive an output encoding from a bidirectional encoder representations from transformers (BERT) model that processed the target portion of user chat data from the platform. The fully connected deep learning layers may be configured to output a predicted label for a type of offensive language for the target portion of user chat data.

This aspect provides the potential benefit of improved contextual feature extraction for the user chat data that may increase the accuracy of the system in differentiating the usage of the same word or phrase that may potentially be offensive when used in one context and non-offensive when used in a different context.

In this aspect, additionally or alternatively, the at least one trained transformer machine learning model may be one of a plurality of trained transformer machine learning models, and each of the plurality of trained transformer machine learning models may be respectively trained to predict labels for a different respective type of offensive language.

This aspect provides the potential benefit of increased accuracy in predicting different types of offensive language by fine-tuning each trained transformer machine learning model for a specific type of offensive language.

In this aspect, additionally or alternatively, the different respective types of offensive language may be selected from the group consisting of a profanity type, a bullying type, an adult language type, and a hate speech type. The hate speech type may include at least one of racist hate speech type and/or sexist hate speech type.

This aspect provides the potential benefit of a chat filtering system that may be fine-tuned for different types of offensive language, and may provide an improved user experience by allowing users to tailor their chat experience to filter out specific types of offensive language.

In this aspect, additionally or alternatively, the user chat filtering program may further include a speech to text model that generates the target portion of the user chat data based on a target portion of user voice data received from the platform, and an acoustic model that generates a set of acoustic features for the target portion of user voice data.

This aspect provides the potential benefit of increased accuracy in recognizing the usage of offensive language in voice chat data.

In this aspect, additionally or alternatively, the at least one trained transformer machine learning model may be further configured to predict a label for the type of offensive language for the target portion of user chat data based on receiving a concatenated input that includes the output encoding from the BERT model that processed the target portion of user chat data generated by the speech to text model based on the target portion of user voice data, and the set of acoustic features generated by the acoustic model for the target portion of user voice data.

This aspect provides the potential benefit of increased accuracy in recognizing the usage of offensive language in voice chat data.

In this aspect, additionally or alternatively, the plurality of trained machine learning models may include at least one trained convolutional neural network (CNN) machine learning model configured to receive input embeddings from a Word2Vec model that processed the target portion of user chat data from the platform, and output a predicted label for an offensive language presence for the target portion of user chat data.

This aspect provides the potential benefit of improved detection of words or phrases that are typically considered offensive.

In this aspect, additionally or alternatively, the at least one trained CNN machine learning model may be further configured to receive input embeddings from a gaming language dictionary encoder that is cross-entropy trained on a corpus of user chat data.

This aspect provides the potential benefit of improved detection of offensive words or phrases that are specific to online gaming communities and would typically not be detected by conventional Word2Vec models.

In this aspect, additionally or alternatively, the user chat filtering program may further include a heuristic offensive language checking module that includes a mapping between words or phrases and predicted labels for a type of offensive language. The filter decision service may be configured to determine the filter action to be performed for the target portion of user chat data further based on an output of the heuristic offensive language checking module that processed the target portion of user chat data.

This aspect provides the potential benefit of improved detection of words or phrases that are considered offensive, but may potentially not have been learned by the trained machine learning models during training.

In this aspect, additionally or alternatively, the user chat filtering program may be further configured to send a feedback package to a moderator user computer device, the feedback package including the target portion of the user chat data and the output of the plurality of trained machine learning models for the target portion of user chat data, receive a feedback response from the moderator user computer device that indicates a moderator selected label of offensive language for the target portion of the user chat data, and perform batched feedback training on the plurality of trained machine learning models based on the received feedback response from the moderator user computer device.

This aspect provides the potential benefit of improved training for the machine learning models to increase the accuracy of the machine learning models in detecting offensive usage of language.

In this aspect, additionally or alternatively, the user chat filtering program may be configured to determine the filter action to be performed for target portions of user chat data based on output of the plurality of trained machine learning models for those target portions of user chat data in real-time as the target portions of user chat data are received from the plurality of client devices at the platform.

This aspect provides the potential benefit of improved user experience for users that are chatting online in real-time by performing chat filtering as the users are entering chat data.

Another aspect provides a method comprising, at one or more processors of a computer device, executing (702) a platform for an online multi-user chat service that communicates with a plurality of client devices of users of the online multi-user chat service and exchange user chat data between the plurality of client devices, and executing (704) a user chat filtering program for performing filter actions for user chat data exchanged on the platform for the online multi-user chat service. The user chat filtering program includes a plurality of trained machine learning models and a filter decision service for determining a filter action to be performed for target portions of user chat data based on output of the plurality of trained machine learning models for those target portions of user chat data. The method further comprises receiving (706) user chat data that includes a first user chat data and a second user chat data, processing (708) the first user chat data and the second user chat data using plurality of trained machine learning models, determining (710) that the first user chat data that includes a target word or phrase is offensive language based on output of the plurality of trained machine learning models for the first user chat data, determining (712) that the second user chat data that includes the same target word or phrase is not offensive language based on output of the plurality of trained machine learning models for the second user chat data, and determining (714) a filter action to be performed for the first user chat data.

This aspect provides the potential benefit of improved detection of offensive usage of language in different contexts such as by differentiating the usage of the same word or phrase that may potentially be offensive when used in one context and non-offensive when used in a different context.

In this aspect, additionally or alternatively, the plurality of trained machine learning models includes at least one trained transformer machine learning model that includes a transformer encoder and a plurality of fully connected deep learning layers. The transformer encoder may receive an output encoding from a bidirectional encoder representations from transformers (BERT) model that processed the target portion of user chat data from the platform, and the fully connected deep learning layers may output a predicted label for a type of offensive language for the target portion of user chat data.

This aspect provides the potential benefit of improved contextual feature extraction for the user chat data that may increase the accuracy of the system in differentiating the usage of the same word or phrase that may potentially be offensive when used in one context and non-offensive when used in a different context.

In this aspect, additionally or alternatively, the at least one trained transformer machine learning model may be one of a plurality of trained transformer machine learning models, and each of the plurality of trained transformer machine learning models may be respectively trained to predict labels for a different respective type of offensive language.

This aspect provides the potential benefit of increased accuracy in predicting different types of offensive language by fine-tuning each trained transformer machine learning model for a specific type of offensive language.

In this aspect, additionally or alternatively, the plurality of trained machine learning models may include at least one trained convolutional neural network (CNN) machine learning model that receives input embeddings from a Word2Vec model that processed the target portion of user chat data from the platform, and outputs a predicted label for an offensive language presence for the target portion of user chat data.

This aspect provides the potential benefit of improved detection of words or phrases that are typically considered offensive.

In this aspect, additionally or alternatively, the at least one trained CNN machine learning model may further receives input embeddings from a gaming language dictionary encoder that is cross-entropy trained on a corpus of user chat data.

This aspect provides the potential benefit of improved detection of offensive words or phrases that are specific to online gaming communities and would typically not be detected by conventional Word2Vec models.

Another aspect provides a computer device (14) comprising a processor (24) configured to execute a client-side chat service program (30) configured to communicate with a platform (20) for an online multi-user chat service (10), the client-side chat service program (30) including a graphical user interface (GUI) (40) that presents user chat data (22) received from the platform (20). The processor (24) is further configured to receive a user selected filter preference (36) that indicates to filter out offensive language from the user chat data (22) presented to a user of the computer device (14) via the GUI (40) of the client-side chat service program (30), send the user selected filter preference (36) to the platform (20); receive user chat data (22) from the platform (20) that is filtered based on the user selected filter preference (36), present the filtered user chat data (66) via the GUI (40) of the client-side chat service program (30). The received user chat data (22) is filtered such that a first user chat data (54) that includes a target word or phrase (62) that is labeled as offensive language based on output of a plurality of trained machine learning models (46) executed by the platform (20) is filtered out of the user chat data (22), and a second user chat data (56) that includes the same target word or phrase (62) that is labeled as not offensive language based on output from the plurality of trained machine learning models (46) executed by the platform (20) is not filtered out of the user chat data (20).

This aspect provides the potential benefit of improved detection of offensive usage of language in different contexts such as by differentiating the usage of the same word or phrase that may potentially be offensive when used in one context and non-offensive when used in a different context.

In this aspect, additionally or alternatively, the user selected filter preference may be selected from a list of types of offensive language that includes a profanity type, a bullying type, an adult language type, and a hate speech type. The hate speech type may include at least one of racist hate speech type and/or sexist hate speech type.

This aspect provides the potential benefit of a chat filtering system that may be fine-tuned for different types of offensive language, and may provide an improved user experience by allowing users to tailor their chat experience to filter out specific types of offensive language.

In this aspect, additionally or alternatively, the user chat data may be filtered by the platform before being sent to the computer device.

This aspect provides the potential benefit of reducing a computational load on the user's computer device and centralizing chat filtering on the platform.

In this aspect, additionally or alternatively, the client-side chat service program may be configured to receive the first user chat data and the second user chat data in the user chat data, receive the output from the plurality of trained machine learning models executed by the platform for the first user chat data and the second user chat data, and determine a filter action to be performed on the user chat data based on the output from the plurality of trained machine learning models and the user selected filter preference.

This aspect provides the potential benefit of an improved user experience by increasing control and customization of chat filtering for the user of the computer device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server system comprising:
one or more processors configured to:
  execute a platform for an online multi-user chat service that communicates with a plurality of client devices of users of the online multi-user chat service, the platform being configured to exchange user chat data between the plurality of client devices;
  execute a user chat filtering program that performs filter actions for incoming user chat data exchanged on the platform for the online multi-user chat service, the user chat filtering program including a plurality of trained machine learning models and a filter decision service that determines a filter action to be performed for target portions of incoming user chat data based on respective outputs of the plurality of trained machine learning models for those target portions of incoming user chat data;
wherein the user chat filtering program is configured to:
  receive incoming user chat data that includes a first user chat data and a second user chat data;
  process the first user chat data and the second user chat data using the plurality of trained machine learning models;
  determine that the first user chat data that includes a target word or phrase is offensive language based on the respective outputs of the plurality of trained machine learning models for the first user chat data;
  determine that the second user chat data that includes the same target word or phrase is not offensive language based on the respective outputs of the plurality of trained machine learning models for the second user chat data;
  determine a filter action to be performed for the first user chat data;

perform the filter action on the first user chat data without performing the filter action on the second user chat data;

send a feedback package to a moderator user computer device, the feedback package including the first user chat data and each of the respective outputs of the plurality of trained machine learning models for the first user chat data;

receive a feedback response from the moderator user computer device that indicates a moderator selected label of offensive language for the first user chat data; and perform batched feedback training on at least one of the plurality of trained machine learning models based on the received feedback response from the moderator user computer device.

2. The server system of claim 1, wherein the plurality of trained machine learning models include one or more trained transformer machine learning models configured to predict labels for different respective types of offensive language.

3. The server system of claim 2, wherein the different respective types of offensive language are selected from the group consisting of a profanity type, a bullying type, an adult language type, and a hate speech type; and wherein the hate speech type includes at least one of racist hate speech type and/or sexist hate speech type.

4. The server system of claim 2, wherein the user chat filtering program further includes:

a speech to text model that generates the target portion of the incoming user chat data based on a target portion of incoming user voice data received from the platform; and an acoustic model that generates a set of acoustic features for the target portion of incoming user voice data.

5. The server system of claim 4, wherein a trained machine learning model of the plurality of machine learning models is configured to predict a label for a type of offensive language to the target portion of incoming user chat data based on receiving a concatenated input that includes:

an output encoding of a trained transformer machine learning model of the one or more trained transformer machine learning models, wherein the trained transformer machine learning model is configured to process the target portion of incoming user chat data generated by the speech to text model; and the set of acoustic features generated by the acoustic model for the target portion of incoming user voice data.

6. The server system of claim 2, wherein the one or more trained transformer machine learning models are trained at least in part on a corpus of labeled user chat data.

7. The server system of claim 6, wherein:

two or more of the trained transformer machine learning models that have been fine-tuned with respective sets of labeled user chat data; and each of the sets of labeled user chat data includes:
 a plurality of instances of user chat data; and
 for each of the instances of user chat data, a corresponding label that indicates a presence or absence of a type of offensive language selected from among the different respective types of offensive language.

8. The server system of claim 1, wherein the user chat filtering program is configured to determine the filter action to be performed for target portions of incoming user chat data based on the respective outputs of the plurality of trained machine learning models for those target portions of incoming user chat data in real-time as the target portions of incoming user chat data are received from the plurality of client devices at the platform.

9. The server system of claim 1, wherein the feedback package includes an aggregated predicted label that is aggregated over the respective outputs of the plurality of trained machine learning models.

10. The server system of claim 1, wherein:

the plurality of trained machine learning models include a heuristic offensive language checking module; and the feedback package includes a heuristic offensive language flag computed at the heuristic offensive language checking module.

11. A method for use with a server system, the method comprising:

executing a platform for an online multi-user chat service that communicates with a plurality of client devices of users of the online multi-user chat service, the platform being configured to exchange user chat data between the plurality of client devices;

executing a user chat filtering program that performs filter actions for incoming user chat data exchanged on the platform for the online multi-user chat service, the user chat filtering program including a plurality of trained machine learning models and a filter decision service that determines a filter action to be performed for target portions of incoming user chat data based on respective outputs of the plurality of trained machine learning models for those target portions of incoming user chat data;

wherein executing the user chat filtering program includes:

receiving incoming user chat data that includes a first user chat data and a second user chat data;

processing the first user chat data and the second user chat data using the plurality of trained machine learning models;

determining that the first user chat data that includes a target word or phrase is offensive language based on the respective outputs of the plurality of trained machine learning models for the first user chat data;

determining that the second user chat data that includes the same target word or phrase is not offensive language based on the respective outputs of the plurality of trained machine learning models for the second user chat data;

determining a filter action to be performed for the first user chat data;

performing the filter action on the first user chat data without performing the filter action on the second user chat data;

sending a feedback package to a moderator user computer device, the feedback package including the first user chat data and each of the respective outputs of the plurality of trained machine learning models for the first user chat data;

receiving a feedback response from the moderator user computer device that indicates a moderator selected label of offensive language for the first user chat data; and performing batched feedback training on at least one of the plurality of trained machine learning models based on the received feedback response from the moderator user computer device.

12. The method of claim 11, wherein the plurality of trained machine learning models include one or more trained transformer machine learning models configured to predict labels for different respective types of offensive language.

13. The method of claim 12, wherein the user chat filtering program further includes:
   a speech to text model that generates the target portion of the incoming user chat data based on a target portion of incoming user voice data received from the platform; and
   an acoustic model that generates a set of acoustic features for the target portion of incoming user voice data.

14. The method of claim 12, further comprising, at a trained machine learning model of the plurality of machine learning models, predicting a label for a type of offensive language to the target portion of incoming user chat data based on receiving a concatenated input that includes:
   an output encoding of a trained transformer machine learning model of the one or more trained transformer machine learning models, wherein the trained transformer machine learning model is configured to process the target portion of incoming user chat data generated by the speech to text model; and
   the set of acoustic features generated by the acoustic model for the target portion of incoming user voice data.

15. The method of claim 12, wherein:
   the one or more trained transformer machine learning models are trained at least in part on a corpus of labeled user chat data;
   two or more of the trained transformer machine learning models that have been fine-tuned with respective sets of labeled user chat data; and
   each of the sets of labeled user chat data includes:
      a plurality of instances of user chat data; and
      for each of the instances of user chat data, a corresponding label that indicates a presence or absence of a type of offensive language selected from among the different respective types of offensive language.

16. The method of claim 11, wherein the user chat filtering program is configured to determine the filter action to be performed for target portions of incoming user chat data based on the respective outputs of the plurality of trained machine learning models for those target portions of incoming user chat data in real-time as the target portions of incoming user chat data are received from the plurality of client devices at the platform.

17. The method of claim 11, wherein the feedback package includes an aggregated predicted label that is aggregated over the respective outputs of the plurality of trained machine learning models.

18. A server system comprising:
   one or more processors configured to:
      execute a platform for an online multi-user chat service that communicates with a plurality of client devices of users of the online multi-user chat service, the platform being configured to exchange user chat data between the plurality of client devices;
      execute a user chat filtering program that performs filter actions for incoming user chat data exchanged on the platform for the online multi-user chat service, the user chat filtering program including a plurality of trained machine learning models and a filter decision service that determines a filter action to be performed for target portions of incoming user chat data based on respective outputs of the plurality of trained machine learning models for those target portions of incoming user chat data;
      wherein the plurality of trained machine learning models include one or more trained transformer machine learning models configured to predict labels for different respective types of offensive language; and
      wherein the user chat filtering program is configured to:
         receive incoming user chat data that includes a first user chat data and a second user chat data;
         process the first user chat data and the second user chat data using the plurality of trained machine learning models;
         determine that the first user chat data that includes a target word or phrase is offensive language based on the respective outputs of the plurality of trained machine learning models for the first user chat data;
         determine that the second user chat data that includes the same target word or phrase is not offensive language based on the respective outputs of the plurality of trained machine learning models for the second user chat data;
         send a feedback package to a moderator user computer device, the feedback package including the first user chat data and each of the respective outputs of the plurality of trained machine learning models for the first user chat data;
         receive a feedback response from the moderator user computer device that indicates a moderator selected label of offensive language for the first user chat data, wherein the moderator selected label indicates the type of the offensive language; and
         perform batched feedback training on at least one of the plurality of trained machine learning models based on the received feedback response from the moderator user computer device.

* * * * *